United States Patent Office 3,336,244
Patented Aug. 15, 1967

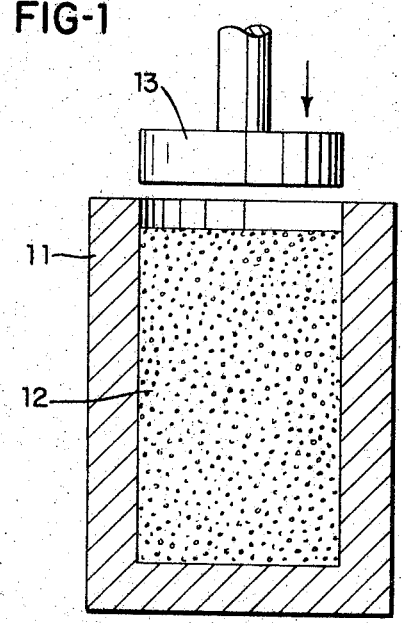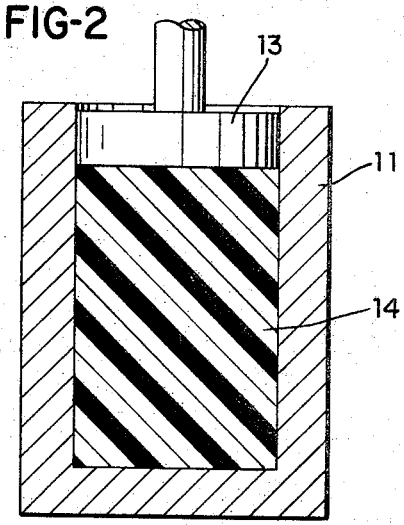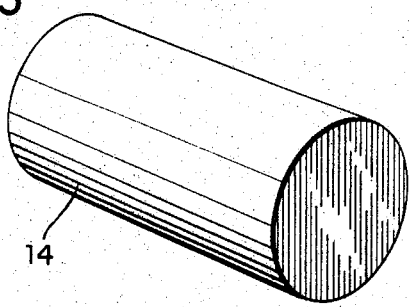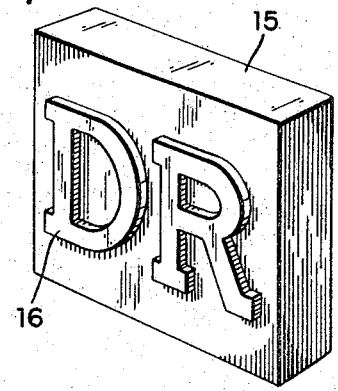

3,336,244
POROUS PRODUCT PREPARED BY SINTERING A MIXTURE OF A POLYOLEFIN, A THERMOSETTING RESIN AND A DIFFERENT THERMOPLASTIC RESIN
Joseph Rockoff, Dayton, Ohio, assignor to Dayco Corporation, Dayton, Ohio, a corporation of Ohio
Filed Apr. 28, 1964, Ser. No. 364,358
14 Claims. (Cl. 260—2.5)

ABSTRACT OF THE DISCLOSURE

An open pore reticulated product for use as a printing member which includes a sintered mixture of particulate polypropylene or polyethylene of high molecular weight and thermosetting and other thermoplastic resins, also in particulate form. The pores are interconnected and constitute between 10% and 40% by volume of the mass, and the product has a Shore D hardness in the range of 65 to 75 and is capable of retaining between 1% and 50% by weight of a pigmented ink having a viscosity of between 400 and 2500 cps. which is delivered in response to the pressure applied to the member. A method of making the member by a sintering operation is also described.

This application is a continuation-in-part of United States patent application Ser. No. 124,947, filed July 18, 1961, now abandoned.

This invention relates to a porous product and method of manufacture. More particularly, it relates to a porous member for use in the manufacture of porous printing rollers, plates, and the like, as well as similar products adapted for other purposes.

In the field of printing, rubber rollers and plates have previously been formed of porous reticulated bodies for the purpose of retaining and transferring dye type inks to type or other members in the printing apparatus. One such product is described in my United States Patent No. 2,763,208, issued Sept. 18, 1956, in which these products have been made of rubber particles. This patent describes a product in which individual rubber particles are bonded together by a thermosetting synthetic resin, and interconnecting voids or passages are provided by the liberation of gas from thermally unstable materials which are incorporated within the mass of rubber and resinous materials. The product was made by introducing the mixture of materials into a mold where application of relatively low pressure on the particles resulted in a porous mass of rubber particles interconnected by voids. As more fully described in the above-referenced patent, such a product has been found to possess a considerable degree of porosity and ink-retaining capacity, as well as strength and durability. A particularly important property of this product was its ability to release ink easily upon simple contact without the application of undue pressure, due to the surface characteristics of the compound and the capillary structure within the mass.

Porous rollers have also been made of polyamide or nylon powders which are compressed and then sintered under nonoxidizing conditions to prevent degradation of the polyamide material. The polyamide powders are generally relatively small in particle size, usually in the order of 40 microns or less. For further description of such rollers, reference is made to United States Patent No. 3,022,542, issued Feb. 27, 1962.

The porous roller of the type described in either of the above patents is used primarily in charge plate printing devices to provide direct reading characters on an original, and to provide a carbon impression on at least two other copies. Generally, the purchaser retains one copy and the remaining two copies are retained by the vendor, one of which is kept in the file, the other of which is forwarded to the purchaser at the time of billing. The direct charge plate system has been widely used in various places, including automotive service stations, department stores, delivery trucks, tool inventory, hospitals and in various other systems and under a wide variety of conditions. For example, temperature variations may be from minus 40° F. to 130° F.; humidity may vary from very high to very low; and the printed receipts may be scanned by machines for automatic processing and billing, or may be handled manually. In the case of machine billing, well defined characters and high contrast are desirable.

Variations of temperature and humidity have important effects on the rollers; if the temperature is increased above 110° F. there is generally a reduction in the viscosity of the ink. It has been observed with nylon as well as rubber rollers, that the printed original image or characters are severely distorted, or bleed to the point where they are almost unrecognizable. On the other hand, reduction of the temperature below zero degrees F. increases the viscosity of the ink, and the resulting ink delivery is somewhat less than that desired, so that a light image generally results. In the case of the rubber roller, variations in humidity do not appear to produce any adverse effects. In the case of the nylon rollers, there is substantial absorption of moisture by the nylon material which may affect the printing quality because it affects the viscosity of the ink.

The life or number of impressions which can be delivered by a roller is another factor which is considered. Generally, the rubber roller and nylon rollers previously described do not provide well printed characters after about 10,000 to 15,000 impressions, either because of poor ink delivery, distortion of the roller material, or a combination of both.

Frequently, the roller is used repeatedly in rapid succession, requiring controlled steady flow of the ink when pressure is applied to the roller. This use of the roller may, for example, take place in tool inventory systems or restaurants wherein one printing device is constantly in use.

Another consideration is the relationship between the ink being used and the type of paper upon which the ink impression is to be made. As a general rule, the receipts used in the charge plate system are of paper which is not of the best quality so that excessive ink deposited on the sheet will spread and blur the image. Even if a blurred image is not obtained, the character of the ink is such that it does not set hard to provide a smudge resistant print. In some instances, the particular bookkeeping system requires that reproduction or copies of the printed bill be submitted to the purchaser or client, in which case any number of reproduction systems are utilized including heat type reproduction systems, photographic type, and electrophotographic type. As a general rule, dye based inks are used with the printing rollers of the rubber and nylon type, and therefore the opacity of the original direct print is relatively low making it difficult to provide a good copy. In the case of heat type copying devices, the lack of pigment in the ink makes it virtually impossible to provide a copy thereof. Additionally, the inks which have been used heretofore are dye based inks of blue or purple color since these colors seem to provide the most legible copies. Automatic scanning systems, however, will not effectively scan black characters which are relatively opaque and which have relatively high contrast. Contrast and opacity are achieved primarily with the use of pigmented inks of the carbon black variety. The rubber and nylon rollers previously described, while capable of accepting pigmented inks, are not capable of delivering the pigmented inks as required during use of the roller. For example, in some cases it has been noted that the pigment portion of the ink has been retained and the roller passes only the ink binder or vehicle.

The present invention is an improvement on the earlier rollers in that a porous product, such as a printing roller or plate, is made of materials which provide improved strength and wear characteristics and which is usable with inks not heretofore successfully applied with a rubber or nylon roller.

Further, the method of manufacturing the present roller represents a simplification of my prior process in that it is possible to omit both the resinous material used for bonding the rubber particles and the gas liberating or blowing agent to provide a unitary structure by the use of a process which is essentially a sintering process. The process of the present invention is different from those processes in which a material is foamed or formed into a sponge, since even foams and sponges having interconnected pores involve increasing the mass size of an original charge as opposed to compacting and heating which generally occurs in a sintering operation. Further, the process of the present invention is somewhat less complex than that carried out with nylon material, since there is no major problem of oxidation nor is close temperature control required. For example, most nylon materials have a melting point which is relatively close to the fusion point, and care must be taken during sintering to maintain the temperature below the melting point.

The product of the present invention is quite porous, and the porosity may be controlled by the temperature and pressures utilized during manufacture, as will be described more fully hereinbelow. The finished product possesses a high degree capillarity, and also possesses a sufficient hardness to provide sharp images not only in the original but of the first and second carbon copies. Additionally, by coordinating the viscosity of the ink with the characteristic of the porous member, improved performance is obtained over a substantial range in temperatures.

Accordingly, it is a primary object of the present invention to provide an improved porous resinous product of the type above described.

Another object of the present invention is to provide an improved porous product of the type above described which possesses improved ink-retaining and ink-releasing characteristics and which is capable of providing relatively sharp images.

Another object of this invention is to provide a porous product for use as a printing roller or plate and the like, which is capable of accepting, holding, and delivering controlled amounts of a pigmented ink in response to relatively light pressure.

A further object of the present invention is to provide a porous product for use as a printing roller or plate and the like, which exhibits relatively long life and substantially uniform ink delivery over a substantial range of temperatures.

A further object of the present invention is to provide an improved method for manufacture of the product of the type described.

Other objects and advantages of the invention will be apparent from the following description, the accompanying drawings, and the appended claims.

In the drawings:

FIGURE 1 is a sectional view of a mold used in the first step for the manufacture of the porous product in accordance with the present invention.

FIGURE 2 is a view similar to FIGURE 1 showing the second step of the formation of the product in accordance with the present invention.

FIGURE 3 is an isometric view of the finished product manufactured in accordance with the present invention.

FIGURE 4 is a view of a plate in accordance with the principles of the present invention having raised characters thereon.

Referring to FIGURES 1 and 2, which illustrate a preferred embodiment in accordance with the present invention, a closed cylindrical mold 11 receives a mass of synthetic plastic particles 12 which are compressed by a piston 13 under substantial pressure to form a compacted porous preform which may thereafter be cured to provide a sintered porous product 14 shown, for example, in FIGURE 3.

The ultimate characteristics of the porous product 14 depend to some extent upon the material constituting the plastic, and accordingly one aspect of the present invention is the coordination and correlation of the characteristics of the plastic material which provides the overall improved performance of the printing roller. The plastic material, which may be a single resin or polymer or a combination of several resins, should be relatively fine in particle size or capable of being reduced to a relatively fine particle size having a typical analysis of particle sizes by weight as follows:

| | Percent |
|---|---|
| Greater than 297 microns in diameter | 0.8 |
| Greater than 149 microns in diameter | 20.8 |
| Greater than 74 microns in diameter | 62.4 |
| Greater than 44 microns in diameter | 10.8 |
| Under 4 microns in diameter | 4.4 |

The preferred form of the invention utilizes blends of materials which provide necessary strength, elasticity and temperature resistance as well as the ink retention and releasing properties. A particularly desirable blend includes certain polyolefin polymers, and thermosetting and thermoplastic resins such as described more fully below.

It has been found that of the polyolefin polymers the high molecular weight polyethylenes of the Ziegler type or these made by low pressure process possess the desired characteristics in this regard as well as offering stiffness, linear strength, relatively low water absorption, high impact strength, chemical resistance, temperature stability, and resistance to cold flow. These particular materials are characterized by a density between 0.930 and 0.965 with a melt viscosity which ranges from nil to approximately 4.5 to 5. The molecular weight of the material is preferably above one million and less than about 3.0 million as determined by the dilute viscosity test,[1] and it is also preferred that the material be highly crystalline between 65% and 95% as determined by the polarized microscope technique, and exhibit a spherulitic structure. Additionally, the high molecular weight materials exhibit relatively low weight loss when tested by a Tabor Abrader by the standard test ASTM D104–56. The higher molecular weight polyethylene material shows better high temperature stability, e.g., higher softening points. For example, material having a molecular weight of about one million exhibits a softening point of about 150° C.

Another of the polyolefins which offers desirable characteristics is polypropylene, also based on the Ziegler catalyst system. This material is characterized by a specific gravity ranging from 0.89 to 0.91 and having a melt flow range of 1 to 20.

The thermosetting material may be selected from epoxy resins, i.e., the polyepoxide reaction products of diphenol or bisphenol and epichlorohydrin, and preferably those which are available as a solid and capable of being finely divided to the particle size previously noted. The solid epoxy resin esters, styrenated epoxy esters and combinations with reactive phenolic, urea, melamine and other

---

[1] One such procedure is described in "Polyethylene" by Raff & Allison, Interscience Publication, New York, 1956.

resins may be utilized and ground to a finely divided state for sintering. Other thermosetting materials which may be utilized include phenol formaldehyde resins, i.e., the condensation product of phenol and formaldehyde.

The thermoplastic materials which may be utilized are vinyl resins, particularly homopolymers of vinyl chloride, but also include vinyl acetate polymers, vinyl chloride-vinyl acetate copolymers and vinyl chloride-vinylidene chloride copolymers. Other vinyl acetate copolymers include vinyl acetate-acrylate copolymers, vinyl acetate-vinylidene chloride copolymers and copolymers of vinyl acetate with propylene, perfluoropropylene or vinyl benzoate. Polyvinyl acetals such as the formaldehyde and polyvinyl alcohols condensation products or butyral and polyvinyl alcohol condensation products may be utilized; for example, the polyvinyl formals, the polyvinyl butyrals and the like, and mixtures of the above resins. Copolymers of vinyl chloride and halogenated olefins may also be utilized. ABS resins (acrylonitrile butadiene-styrene resins) may also be utilized, particularly ABS resins containing between 50% and 90% by weight of styrene-acrylonitrile. These latter resins are characterized by relatively high impact strength and chemical resistance, with the impact strength being related to the butadiene content. Mixtures of the above may also be used.

If desired, fillers may be used to minimize unwanted bleeding of the inks at high temperatures. Typical fillers include diatomaceous earth.

The following examples illustrate various formulations utilizing some of the materials more fully described above, in accordance with the present invention, listing the proportions by weight:

ture, thereby effecting sintering of the adjacent particles together to form a unitary product 14 which remains porous and includes voids which contain air.

The resulting structure is reticulated or cellular, having a porosity governed by the pressure applied during formation of the preform and the temperature of sintering. During the cure, the entrapped air tends to act as a blowing agent and the voids actually expand somewhat from their volume in the preform. The expansion of air operates to increase the dimensions slightly, and upon completion of the cure the compressed product is approximately 2⅞ inches long representing an expansion of about 15% from the cold preformed state. Although a slight shrinkage occurs upon cooling of the cured or sintered product, the finished product remains essentially the dimensions of the product after the 15% expansion. The percentage of voids in the finished product has been calculated to range from 10% to 40% of the volume of the entire mass, and the density is about 0.96 gram per centimeter.

The resultant porous product may thereafter be ground to final close tolerances without destroying the reticulated or open cell structure, and thereafter processed to introduce ink into the pores. The particular product described is capable of holding up to about 50% of its own weight in ink thus providing an inked porous product which gradually releases this ink by capillary action in response to applied pressure.

One of the features of the present invention relates to the ink-retaining and ink-delivery characteristics of the porous product. As also stated previously, the porous nylon and porous rubber products of the prior art are

| Ex. No. | High Mol. Wt. Polyethylene | Phenol Formaldehyde Resins | Epoxy Resins | Vinyl Chloride | Other | Filler |
|---|---|---|---|---|---|---|
| 1 | 20 | 30 | | 50 | | |
| 2 | 25 | 30 | | 45 | | |
| 3 | 25 | 30 | | 35 | | 10 |
| 4 | 25 | 30 | | 30 | | 15 |
| 5 | 20 | 25 | | 40 | | 15 |
| 6 | 21.6 | 26.6 | | 41.6 | | 10 |
| 7 | 25 | 30 | | | Vinyl chloride plus halogenated olefins, 45 parts. | |
| 8 | 25 | 30 | | | Polyvinyl formal, 45 parts. | |
| 9 | 25 | 30 | | | Polyvinyl butyral, 45 parts. | |
| 10 | 25 | 30 | | | ABS resin, 45 parts | |
| 11 | 25 | | 30 | 45 | | |
| 12 | 25 | | | 45 | ABS resin, 30 parts | |
| 13 | 45 | 55 | | | | |
| 14 | 30 | 70 | | | | |
| 15 | 10 | 90 | | | | |
| 16 | 65 | 35 | | | | |
| 17 | 50 | 30 | | | | 20 |
| 18 | 50 | | 30 | | | 20 |
| 19 | 30 | | 50 | | | 20 |

In making the porous product of the present invention, the resinous starting material is ground to the fineness previously indicated and blended or mixed in the proportions specified. Thereafter, a predetermined amount of material is introduced into the cylindrical mold which may be, for example, 1½ inches in diameter and 10 inches in length. The powdery material is compressed by the piston 13 (shown in a compression stroke in FIGURE 2) under about 10,500 p.s.i. to form a preform which has a length of about 2½ inches, or approximately 25% of the volume of the original charge. In this cold compressed state, the preform includes entrapped air which has been calculated as consisting of about 5% to 10% of the entire mixture. The preform is then cured preferably by increasing the temperature in increments up to about 220° F. to 280° F., for a total time of 2 to 2½ hours. The temperature of heating is maintained below the melting point but above the fusion point of the mixcapable of being impregnated with an ink; however, the nature of these products has limited the type of ink used to dye base inks containing no solid pigments. Additionally, these inks were of relatively low viscosity, being of the order of 325 centipoises [2] which exhibited a sufficient change in viscosity at high temperatures to cause blurred inked images because of the free flowing characteristics of the ink at elevated temperatures. In accordance with the present invention it is possible to utilize pigmented inks having a viscosity of between 1300 centipoises and 2500 centipoises, and which operate satisfactorily both at high temperatures and at relatively low temperatures as determined by hot and cold bleed tests as follows:

The inked roller is assembled in a printing device which is then stored in a cold room maintained at a

---

[2] Measured at 75° F. with a Brookfield viscometer using a No. 2 spindle at 12 r.p.m.

temperature of minus 16° F. The device is then operated in the cold room to determine temperature effect. The roller of the present invention, made according to Example 2, which is the preferred form, operates satisfactorily to provide sharp clear images despite the use of pigmented inks not heretofore used with the rubber or nylon rollers.

A heat test was performed in which the inked roller was assembled in the printing device, which was then stored at a temperature of approximately 130° F. The device was operated at this temperature to determine the temperature effect. The resultant images appeared relatively sharp and no blossoming or blooming was noted as occurs with the nonpigmented inks which become quite fluid and run relatively freely at an elevated temperature.

Another feature of the present invention relates to the ability of the porous product in accordance with the present invention to accept, hold, and deliver pigmented printing inks of various types. The ability to hold and to deliver such inks is, of course, of significance especially in the case of magnetic printing inks so as to provide characters or information which may be scanned automatically for computer processing.

While the exact reasons are not yet completely understood, it is known that the rubber and nylon rollers previously described do not function properly with a pigmented ink either because the roller fails to accept and to hold the ink, or having accepted the ink, the roller delivers only a portion of the ink, for example the vehicle, while retaining other components. The roller of the present invention, however, readily accepts, holds, and delivers the pigmented type inks as required during operation of the printing roller.

The rollers of the present invention will have a hardness of about 65 to 75 on the Shore D scale. While other hardnesses may be obtained, this seems to provide optimum results.

In evaluating the performance of the roller, life tests were performed comparing a roller made according to Example 2 described above and a roller of 100 parts rubber and 30 parts phenol formaldehyde with approximately 20 parts of sulphur and other additives necessary for curing the rubber. Both rollers were similarly treated with a purple dye base ink and run to see how many impressions would be provided by the roller. The rubber roller provided readable prints up to about 44,000 impressions at about which time the prints became light, the characters broken, and readable only with difficulty. The roller made according to Example 2 provided over 100,000 prints of acceptable quality and which were easily read.

A similar test was undertaken using a pigmented ink with the test rollers above, and the rubber test roller did not provide any print whatsoever since it delivered the vehicle which was yellowish in color and none of the pigment portion of the ink; while the roller made according to Example 2 provided 20,000 impressions which was far in excess of what had been expected.

In another series of tests comparing the performance of these two rollers, impressions were made at the rate of between 60 and 90 impressions per minute to determine the flow and delivery characteristics of the ink in response to pressure. With the rubber type roller previously noted, a slight recovery time was required after about five minutes of operation in order to allow the ink to work its way to the surface of the roller; while in the case of the plastic roller of the present invention, no such recovery time was required, and the roller operated satisfactorily for an extended period of time without the necessity of stopping its use in order to permit ink flow to the surface of the roller. This series of tests indicated that the roller of the present invention exhibited far superior ink flow characteristics than the rubber roller of the prior art and, therefore, could be used with automatic equipment which required high speed multiple impressions for extended periods of time from an inked porous roller.

Other comparative data showing the difference between the rubber-phenol formaldehyde roller described above, and the improved roller of the present invention based on the preferred form as described in Example 2 is as follows:

|  | Rubber-Phenol Formaldehyde Roller | Plastic Roller |
| --- | --- | --- |
| Percentage Porosity | 22.26 | 21.15 |
| Modulus of Elasticity (p.s.i.) | $1.29 \times 10^6$ | $3.57 \times 10^6$ |
| Blow Pressure [1] (inches of mercury) | 17.30 | 32.17 |
| Surface Roughness (RMS) (micro inches) | 153 | 130 |

[1] Blow pressure is the pressure necessary to force air through approximately 0.37 inch thickness of ink impregnated roller material.

Although the principal product of the present invention is that of the roller which has been illustrated in FIGURES 1 to 3, other products, such as rectangular printing plates as shown in FIGURE 4, may also be provided in accordance with the present invention. In this case, a mold which is rectangular will be used in which the powders are placed within the mold and compressed as previously described. Thereafter, the rectangular preform is sintered as previously noted, and the resultant product 15 will have a raised surface 16 outlining the desired legend or characters to be transmitted in the form of a printing plate.

It is to be understood that either the roller 14 or plate 15, after formation in the finished shape as described, is normally treated for ink retention by immersing in an ink bath until the porous product has picked up sufficient ink to fill the voids originally present. After treating, the excess ink is removed from the surface and the roller is ready for use. Instead of ink, nondrying or nonevaporative liquids may be carried within the product described above; for example, paints, varnishes, glues, and sizes may be supplied in a continuous manner from such a roller or plate.

While the process and product herein described constitute preferred embodiments of the invention, it is to be understood that the invention is not limited to this precise process and product, and that changes may be made therein without departing from the scope of the invention which is defined in the appended claims.

What is claimed is:

1. A printing member comprising a sintered mass of synthetic plastic material said mass having a reticulated open pore structure wherein said pores are interconnected and constitute between about 10% and 40% by volume of said mass, said mass of plastic material comprising as essential ingredients between 10% and 50% by weight of a polymer selected from the group consisting of polypropylene having a specific gravity in the range of 0.89 to 0.91 and having a melt flow range of 1 to 20 and polyethylene having a molecular weight between 1 and 3 million, and between 25% and 95% of a thermosetting resin and between 30% and 50% by weight of a thermoplastic resin different from said polymer, and said printing member containing between 1% and 50% by weight of a pigmented ink.

2. A printing member comprising a sintered mass of synthetic plastic material and including as essential ingredients between 10% and 50% by weight of a polymer selected from the group consisting of polypropylene having a specific gravity in the range of 0.89 to 0.91 and having a melt flow range of 1 to 20 and polyethylene having a molecular weight between 1 and 3 million, and between 25% and 95% of a thermosetting resin and between 30% and 50% by weight of a thermoplastic resin different from said polymer, said mass having a reticulated open pore structure wherein said pores are interconnected and constitute between about 10% and 40% by volume of said mass, said printing member containing between 1% and 50% by weight of a pigmented ink, and the pore size of said mass being coordinated and correlated with pigment size of said ink to permit penetration, retention of said ink, and delivery of said ink in response to pressure applied to said member.

3. A printing member comprising a sintered mass of synthetic plastic material, said mass having a reticulated open pore structure wherein said pores are interconnected and constitute between about 10% and 40% by volume of said mass, said plastic material including a polyethylene polmer, a thermosetting resin, and a thermoplastic resin different from said polyethylene polymer, the proportion of said resins and polymer being coordinated and correlated to provide a porous mass having a Shore D hardness of between about 65 and 75, said polyethylene polymer having a melt viscosity between about nil and 5 and a crystallinity of between about 65% and 95%, and said printing member containing between about 1% and 50% by weight of a printing ink having a viscosity between about 400 and 2500 cps.

4. A printing member comprising a sintered mass of synthetic plastic material, said plastic material including between about 10% and 50% by weight of a crystalline polyethylene polymer, between about 25% and 95% by weight of a thermosetting resin, and between 30% and 50% by weight of a thermoplastic resin different from said polyethylene polymer, said polyethylene polymer having (1) a melt viscosity of between about nil and about 5, (2) a molecular weight of between 1 and 3 million, and (3) a crystallinity of between about 65% and 95%, said mass having a reticulated open pore structure wherein said pores are interconnected and constitute between about 10% and 40% by volume of said mass, and said printing member containing about 1% to 50% by weight of an ink.

5. A printing member comprising a sintered mass of synthetic plastic material, said plastic material including between about 10% and 50% by weight of a polyethylene polymer, between about 25% and 95% by weight of a thermosetting material, and between about 30% and 50% by weight of a thermoplastic material different from said polyethylene polymer; said polyethylene polymer having a melt viscosity of between about nil and about 5; said thermosetting material being selected from the group consisting of phenol formaldehyde resins, epoxy resins, epoxyester resins, styrenated epoxy ester resins, and combinations thereof with reactive phenolic, urea and melamine resins; said thermoplastic material being selected from the group consisting of vinyl chloride polymers, vinyl acetate polymers, copolymers of vinyl chloride-vinyl acetate, vinyl acetate-acrylate, vinyl acetate-vinylidene chloride, vinyl chloride-vinylidene chloride, vinyl acetate-propylene, vinyl acetate-prefluoroethylene, vinyl acetate-vinyl benzoate, vinyl chloride-halogenated olefins, vinyl acetate-ABS resins, polyvinyl formal resin, polyvinyl butyral resins, and mixtures thereof; said mass having a reticulated open pore structure wherein said pores are interconnected and constitute between about 10% and 40% by volume of said mass, said printing member containing about 1% to 50% by weight of an ink having a viscosity between about 400 cps. and 2500 cps., and the pore size of said mass being coordinated and correlated with the viscosity of the ink to permit penetration and retention of said ink, and release thereof in response to pressure applied to said member.

6. A porous product comprising a sintered mass of synthetic plastic material, said mass having a reticulated open pore structure wherein said pores are interconnected and constitute between about 10% and 40% by volume of said mass, said plastic material including a polyethylene polymer, a thermosetting resin and a thermoplastic resin different from said polyethylene polymer, said resins and polymer being present in relative proportions to provide a member having a Shore D hardness in the range of about 65 to 75, and said polyethylene polymer having a melt viscosity between about nil and 5 and a molecular weight in the range or between about 1 and 3 million as determined by the dilute viscosity method.

7. A porous product comprising a sintered mass of synthetic plastic material, said plastic material including between about 10% and 50% by weight of a polyolefin polymer, between about 25% and 95% by weight of a thermosetting material, and between 30% and 50% by weight of a thermoplastic resin different from said polyolefin polymer, said polyolefin polymer having a melt viscosity of between about nil and about 5, and said mass having a reticulated open pore structure wherein said pores are interconnected and constitute between about 10% and 40% by volume of said mass, and said member having a Shore D hardness of between about 65 and 75.

8. The product of claim 7 having a density of approximately 0.96 gram per cubic centimeter.

9. The product of claim 7 in which at least 95% by weight of said particles range from 44 to 297 microns in diameter.

10. A porous product comprised of a mass of finely divided synthetic plastic particles bonded together to form a sintered porous body having a reticulated cellular structure with a density of approximately 0.96 gram per cubic centimeter, the cells in said cellular structure comprising between 10% and 40% of the total volume thereof, at least 95% of said particles by weight ranging from 44 to 297 microns in diameter said particles consisting of a mixture of polyvinyl chloride, polyethylene having a molecular weight over one million, and phenol formaldehyde resin.

11. A method of manufacturing a porous product having interconnected cells which comprises the steps of compressing a charge of finely divided synthetic plastic particles to a mass of a predetermined shape wherein said particles retain separate identity, said charge comprising as essential ingredients between 10% and 50% by weight of a polymer selected from the group consisting of polypropylene having a specific gravity in the range of 0.89 to 0.91 and having a melt flow range of 1 to 20 and polyethylene having a molecular weight between one and three million, and between 25% and 95% by weight of a thermosetting resin and between 30% and 50% by weight of a thermoplastic resin different from said polymer, said compressed mass having a volume less than the volume of said charge and including a predetermined quantity of voids, and subsequently heating said compressed mass at a temperature sufficiently high to sinter adjoining particles together but sufficiently low to create a reticulated cellular structure within said material wherein the quantity of voids is greater than said predetermined quantity, at least 95% by weight of said particles having a size ranging from 44 to 297 microns in diameter.

12. A method of manufacturing a porous product having interconnected cells which comprises the steps of compressing a charge of finely divided synthetic plastic particles to a mass of a predetermined shape having voids and wherein said particles retain separate identity, said charge comprising as essential ingredients between 10% and 50% by weight of a polymer selected from the group consisting of polypropylene having a specific gravity in the range of 0.89 to 0.91 and having a melt flow range of 1 to 20 and polyethylene having a molecular weight between one and three million, and between 25% and 95% by weight of a thermosetting resin and between 30% and 50% by weight of a thermoplastic resin different from said polymer, heating said particles at a temperature sufficiently high to simultaneously sinter adjoining particles and to increase the volume of said voids but sufficiently low to maintain said structure.

13. The method of claim 12 in which said compression reduces the volume of said material by no more than 67%.

14. The method of claim 12 in which at least 95% of said particles by weight range in diameter from 44 to 297 microns.

References Cited

UNITED STATES PATENTS

| | | | |
|---|---|---|---|
| 2,763,208 | 9/1956 | Rockoff et al. | 260—2.5 |
| 2,777,824 | 1/1957 | Leeds | 260—2.5 |
| 2,849,028 | 8/1958 | Clark et al. | 260—2.5 |
| 3,022,542 | 2/1962 | Davis | 260—2.5 |
| 3,024,208 | 3/1962 | Goethel | 260—2.5 |
| 3,055,297 | 9/1962 | Leeds | 260—33.4 |

SAMUEL H. BLECH, *Primary Examiner.*

J. C. BLEUTGE, *Assistant Examiner.*

UNITED STATES PATENT OFFICE
CERTIFICATE OF CORRECTION

Patent No. 3,336,244          Dated August 15, 1967

Inventor(s) Joseph Rockoff

It is certified that error appears in the above-identified patent and that said Letters Patent are hereby corrected as shown below:

Column 4, line 31, "4" should read -- 44 --.

Signed and sealed this 7th day of September 1971.

(SEAL)
Attest:

EDWARD M. FLETCHER, JR.　　　　　　　　ROBERT GOTTSCHALK
Attesting Officer　　　　　　　　　　　　Acting Commissioner of Patents